No. 630,865. Patented Aug. 15, 1899.
W. H. DALBEY.
POST HOLE DIGGER.
(Application filed Jan. 27, 1899.)
(No Model.)

WITNESSES:
L. E. Snow.
C. Chambers.

INVENTOR
William H. Dalbey
BY
J. H. Snow,
ATTORNEY.

THE NORRIS PETERS CO., PHOTO-LITHO., WASHINGTON, D. C.

UNITED STATES PATENT OFFICE.

WILLIAM H. DALBEY, OF INDIANAPOLIS, INDIANA, ASSIGNOR TO JAMES THOMPSON LAYMAN, OF SAME PLACE.

POST-HOLE DIGGER.

SPECIFICATION forming part of Letters Patent No. 630,865, dated August 15, 1899.

Application filed January 27, 1899. Serial No. 703,609. (No model.)

*To all whom it may concern:*

Be it known that I, WILLIAM H. DALBEY, a citizen of the United States, residing at Indianapolis, in the county of Marion and State of Indiana, have invented a new and useful Improvement in Post-Hole Diggers, of which the following is a specification.

My invention relates to certain new and useful improvements in post-hole diggers; and it has for its object a claw-shaped digger so arranged that it will dig in gravel or stony ground. The diggers now on the market and in use have a smooth cutting-blade, and when said blade strikes a stone the digger will not work, while with my improved digger having the claws on the blade, the claws being turned down and shaped like a mole-claw, the stone is grappled and cast up with the soil without stopping the work of the digger.

Figure 2:
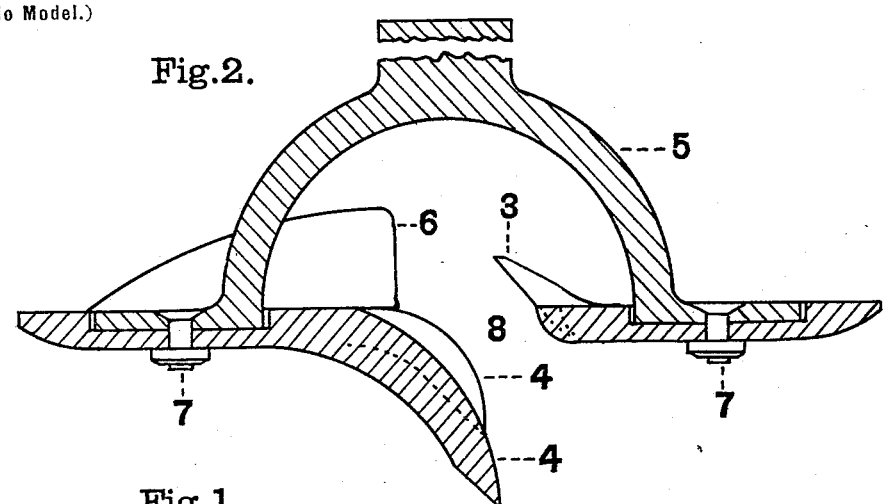
Figure 1:
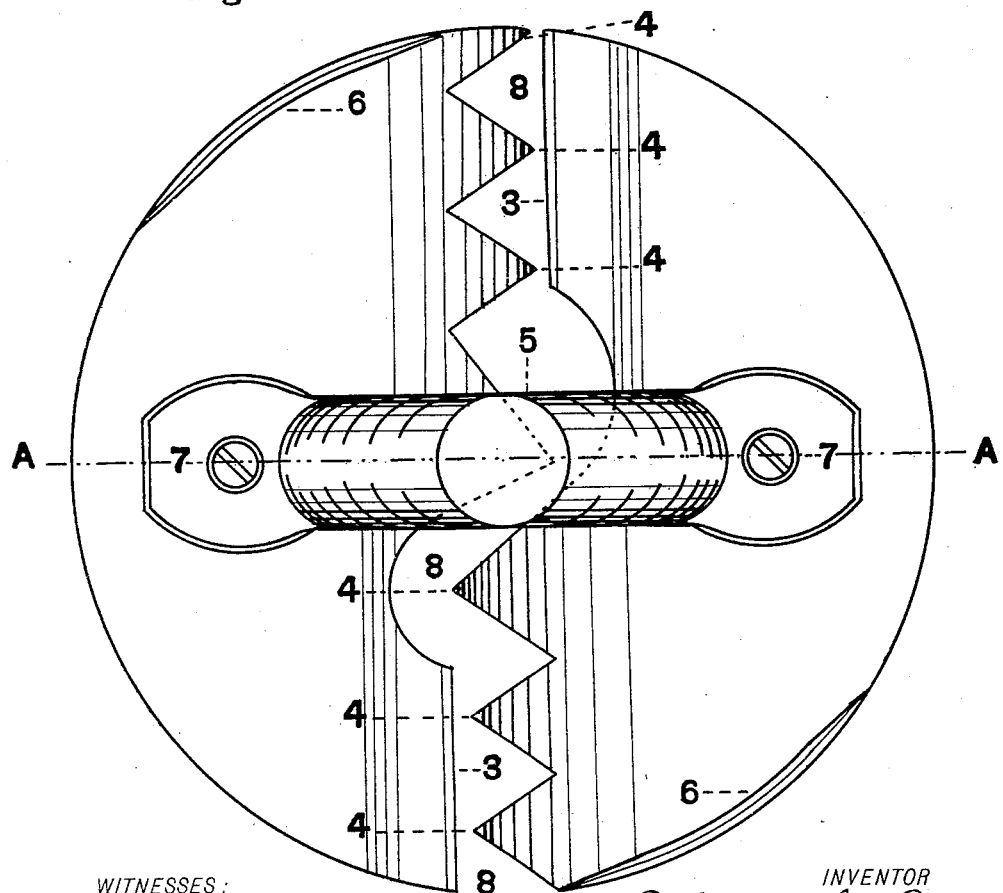

In the drawings, Figure 1 is a top view of the digger. Fig. 2 is a side sectional view taken on the line A A in Fig. 1.

Similar numerals of reference indicate corresponding parts in both figures of the drawings.

3 designates the smooth slightly-turned-up blade that follows the claws.

4 designates the claws, the two center claws being slightly longer than the others.

5 designates the handle, forked and the ends flattened to fit in the depressions in the blades and secured thereto by bolts or rivets, thereby holding the two blades in proper position.

6 designates a smooth upwardly-turned portion of the blade to cut the side of the hole and keep it smooth while the claws are cutting downward.

7 designates the rivet or bolt holding the handle to the blades and holding said blades in proper position.

8 designates the space between the blades left open to allow the soil to pass through and upward as it is dug and cast up by the claws.

The operation of my digger is the same as the common diggers in use. A T or auger shaped handle is placed on the end of the handle 5, and the auger or digger is turned the same as any common digger, and the mole-shaped claws take hold in the soil the same in stony or gravel ground as the common digger does in loam.

Having thus described my invention, what I claim, and desire to secure by Letters Patent, is—

In a post-hole digger, the combination with a handle terminating in a fork at the lower end, of a pair of semicircular plates secured to the forked lower end of the handle, said plates having downwardly-turned claws or teeth on their inner edges, one of said claws or teeth approximately in the center and of greater length than the other, follow-blades turned upwardly in position to follow after the teeth or claws and upturned cutting-blades 6, 6 at the outer edges approximately concentric with the center claw or tooth.

In testimony that I claim the foregoing as my own I have hereunto affixed my signature in the presence of two witnesses.

WILLIAM H. DALBEY.

Witnesses:
J. H. SNOW,
JESSE D. HARWICK.